Patented Aug. 18, 1925.

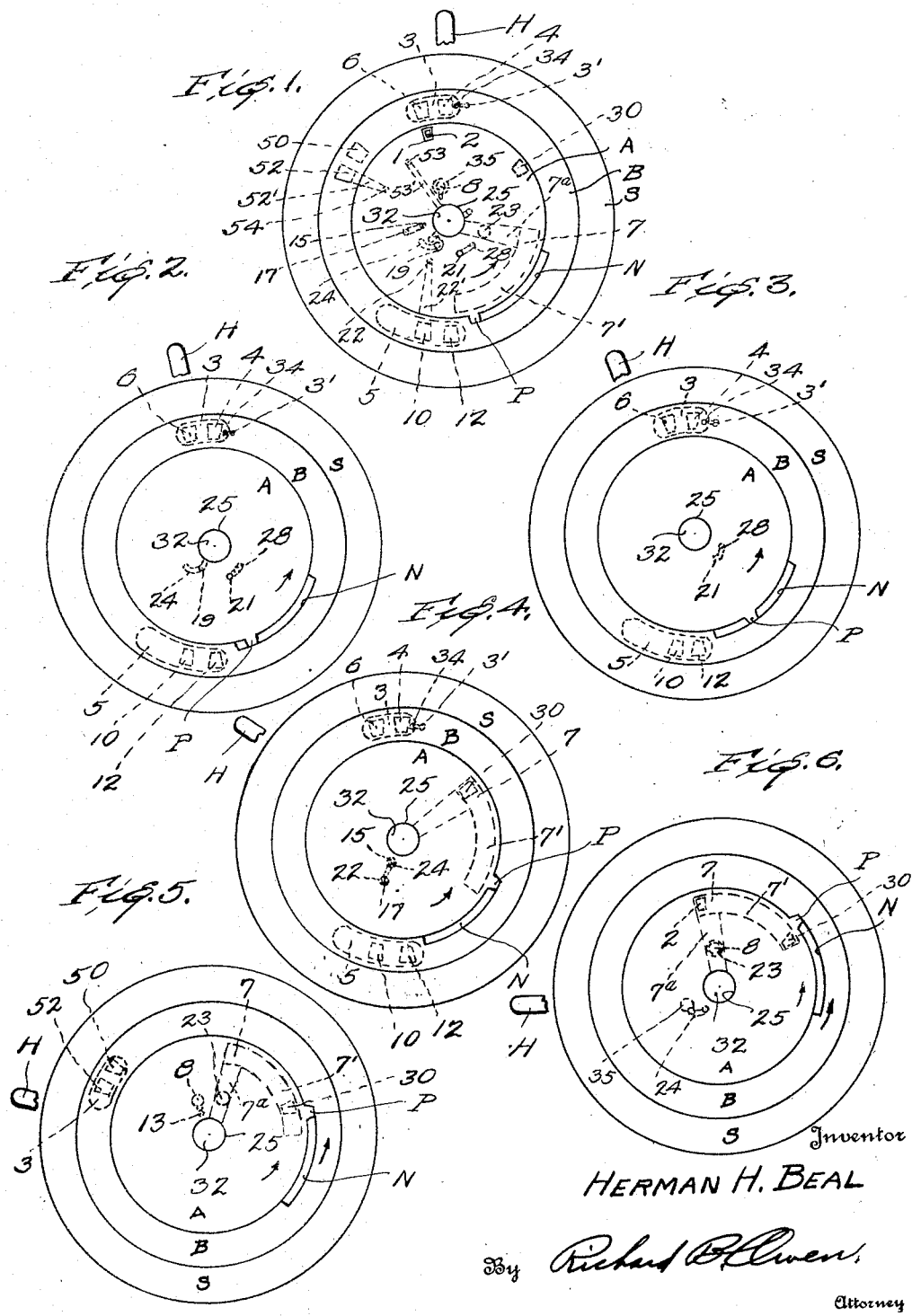

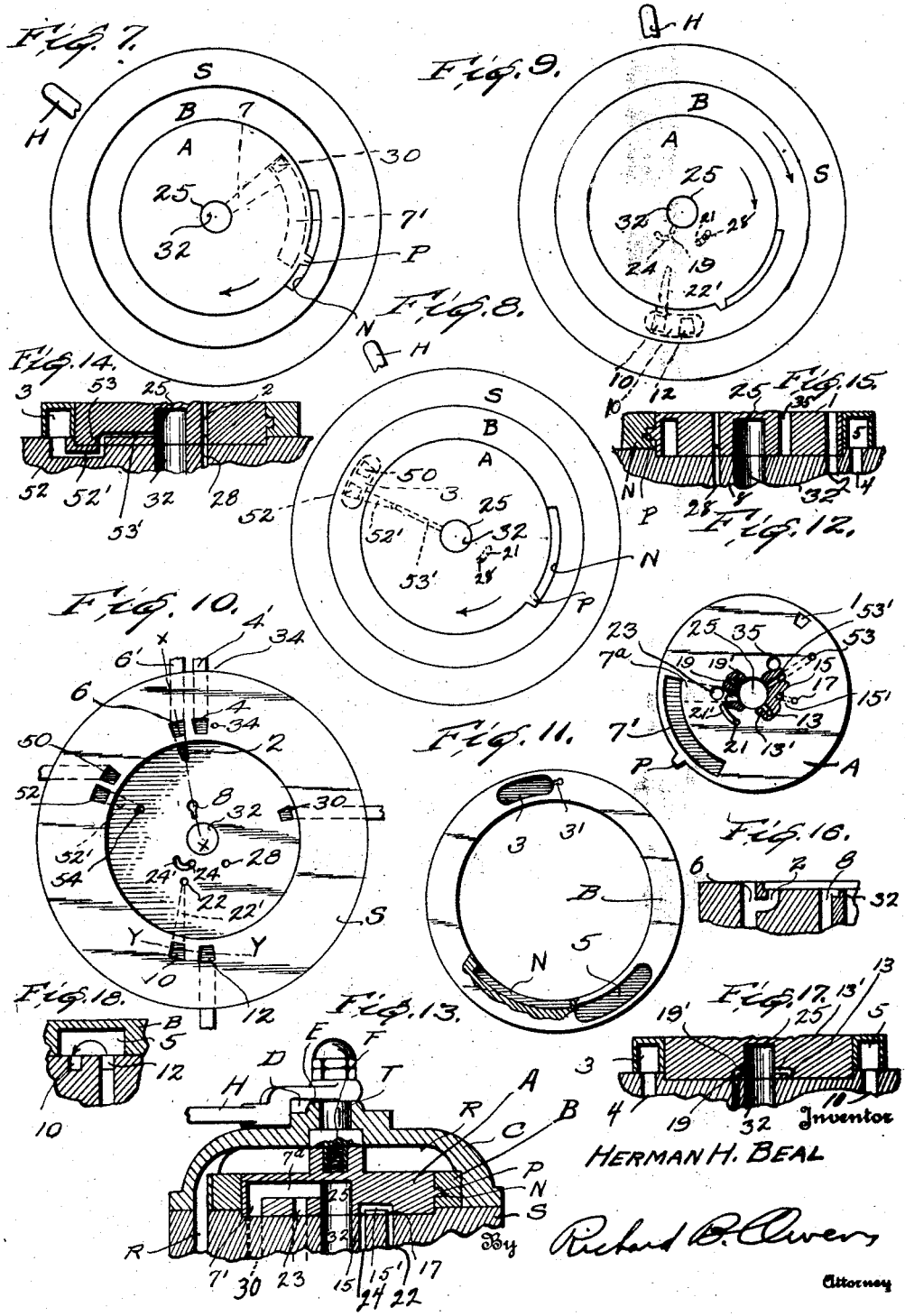

1,550,488

UNITED STATES PATENT OFFICE.

HERMAN H. BEAL, OF STEUBENVILLE, OHIO.

ENGINEER'S VALVE.

Application filed December 3, 1924. Serial No. 753,731.

*To all whom it may concern:*

Be it known that I, HERMAN H. BEAL, a citizen of the United States, residing at Steubenville, in the county of Jefferson and State of Ohio, have invented certain new and useful Improvements in Engineers' Valves, of which the following is a specification.

The present invention appertains to an engineer's brake valve for air brake systems and has for its object to provide such a valve wherein both automatic valve and what is known as the independent valve are included in a single valve, so as to dispense with one set of pipe connections and the use of the conventional double heading cock, and which is in compact and simple form and has the operating means conveniently located and so arranged that the valve can be readily yet safely operated.

A further object of the invention is to provide such a valve with an efficient structure which is reliable in operation and well adapted to the purpose for which it is designed.

With the above and numerous other objects in view, the invention resides in certain novel features of construction and in the combination and arrangement of parts as will be hereinafter more fully described and claimed.

In the drawing:

Figure 1 is a diagrammatic plan view showing the valve in full release position, Figure 2 is a similar view showing the valve in running and independent release position, Figure 3 is a similar view showing the valve in holding and independent lap position, Figure 4 is a similar view showing the valve in independent service and automatic lap positions, Figure 5 is a similar view showing the valve in automatic service position, Figure 6 is a similar view showing the valve in emergency position, Figure 7 is a similar view showing the valve in lap position, Figure 8 is a similar view showing the valve in holding position after an emergency or service application, Figure 9 is a similar view showing the valve in independent release position after an emergency or service application.

Figure 10 is a top plan view of the valve seat,

Figure 11 is a bottom plan view of the outer segment of the rotary valve,

Figure 12 is a bottom plan view of the inner segment of the rotary valve,

Figure 13 is a vertical section through the valve showing the same in number four or independent service and automatic lap position, Figure 14 is a detail vertical section showing the valve in number eight or holding position after an emergency or service position, Figure 15 is a detail vertical section showing the valve in number one or full release position, Figure 16 is a detail vertical section through the valve seat taken substantially on the line $x$—$x$ of Figure 10, Figure 17 is a detail vertical section showing the valve seat in number two, running or independent release position, and Figure 18 is a detail section through the seat taken substantially on line $y$—$y$ of Figure 10 also showing passage 5 of segment B of the rotary valve.

The valve which I have shown by way of example in the drawing is adapted to any suitable modern air brake system in which provision is made for controlling the engine and tender brakes independently of the train brakes, and in which there is in the engineer's cab a second valve, known as the independent brake valve in addition to the usual automatic brake valve. In the drawings the valve is shown of the general type of the standard Westinghouse automatic engineer's valve and embodies in the casing a valve including segments A and B which takes the place and performs the function of the usual independent brake valve found in Westinghouse systems as well as the automatic brake valve. As usual the valve casing comprises a plurality of sections built up in the manner of the Westinghouse's brake valves of which, in Figure 13 I have disclosed the seat S, the valve proper including segments A and B, the cap C which forms the chamber R. These sections are secured together in the usual or any preferred way. The segment A is engaged as is usual by a stem T which extends through the top of the cap C and to which is connected the usual automatic brake handle H provided with the usual spring pressed dog D for engaging notches in the segment E, as is usual, to indicate the different positions of the valve. A spring F is mounted in the stem T and holds the valve to its seat.

As has been indicated above the valve proper includes an inner segment A in the form of a disc or annular plate rotatable within an outer segment B in the form of a ring. A pin or lug P extends from the edge or periphery of the segment A to move within a slot or elongated notch N provided on the inner edge or periphery of the segment B thus forming a pin and slot connection between the two segments so that one will follow the other but allowing a limited independent movement of one in relation to the other or in other words forming a take up and follow up connection. The ports, passages, and cavities in the valve proper and in the seat will be described in connection with the several figures.

The first position which I will discuss is commonly called full release position which is shown in Figure 1. In this position the handle is placed to the extreme left at which time both segments A and B of the rotary valve are turned to the extreme left. This allows the main reservoir port 1 in the segment A to overlap port 2 in the seat causing direct communication between the main reservoir and brake pipe. The brake pipe is indicated in Figure 10 at 6'. Port 35 in the valve segment A overlaps port 8 in the seat thus connecting the main reservoir with the equalizing reservoir. Cavity 3 in the valve segment B overlaps feed valve port 4 and brake pipe port 6 in the seat causing an indirect connection between the main reservoir and the brake pipe by way of the feed valve, the feed valve connection being indicated at 4' in Figure 10. The cavity 3 through extension 31 overlaps the port 34 in the seat allowing the feed valve air to communicate with the equalizing reservoir. The small groove in the face of the rotary valve, segment A which connects with port 21 and is indicated at 21', now overlaps port 28 in the seat causing the main reservoir air to flow to the brake valve connection of the low pressure pump governor. The exhaust port 25 in the segment A of the rotary valve overlaps the exhaust port 31 in the seat (this is true also in all other positions of the rotary valve). All other ports, passages, and cavities are inactive in this number one or full release position. If the valve should be left in this position the brake pipe would charge to the main reservoir pressure, therefore, it should be carried in this position only until the brake pipe and auxiliary reservoir are charged within five or six pounds of the authorized feed valve pressure, then moved to running or holding or independent application position. While in this position, full release, the train brake will release and the equalizing portion of the distributing or controlling valve will release, but the engine brake will remain applied until the handle H is moved to running position.

A number of possible combinations of the valve segments A and B are not active positions, and therefore, in the drawings only their active positions have been shown, and in order to avoid confusion on account of the multiplicity of ports, passages and cavities, in the diagrammatic views shown in Figures 2 to 9 inclusive only those ports, passages and cavities are illustrated which are active in the particular position being shown.

If the handle is now placed in running and independent release position as shown in Figure 2, the segment A will turn to the right that is in a counter clockwise direction as shown in the drawings, but the segment B will remain in the same position as in Figure 1. In number two or running and independent and release position, the feed valve port 4 and the brake pipe port 6 and the equalizing port 34 in the seat are overlapped by the cavity 3 and the extension of cavity 3 to 31 in the segment B of the rotary valve and thus air is flowing from the main reservoir to the brake pipe and equalizing reservoir through the feed valve only, where it is reduced to the authorized feed valve pressure. A groove 21' in the face of the segment A of the rotary valve is connected to port 21 and overlaps port 28 in the seat and thus air flows from the main reservoir below pressure pump governor as in full release position. Port 19 in the segment A of the rotary valve which connects to the exhaust port 25 now overlaps application cylinder pipe port 24 in the seat, and thus allows the air from the application cylinder to escape to the exhaust, this in turn allowing the engine brake to release. This is the only position of the handle H which will allow the engine brake to release. I have now described in detail in full release and running positions and have charged the brake pipe and auxiliary reservoir and pressure chamber and have the brake released on the train and engine.

The third or holding and independent lap position is illustrated in Figure 3 and will be referred to later on in the description.

The fourth or independent service and automatic lap position is shown in Figure 4. In this position the brakes are to be applied on the engine only. As the handle is turned to this position the segment A of the rotary valve only has turned and the segment B has remained in the same position as in positions 1, 2 and 3. The cavity 3 and extension of cavity 3 and port 31 overlaps ports 4, 6 and 34 and the air from the main reservoir flows to the brake pipe and equalizing reservoir through the feed valve. Ports 15 and 17 in the segment A of the rotary valve which are connected by a passage 15′ now overlap the application cylinder pipe port 24 in the seat and port 22 in the seat. Port 22 is connected to port 10 in the seat by a passage 22′. The cavity 5 in the segment B of the rotary valve overlaps the port 10 in the seat and the reducing valve port 12 also in the seat thus allowing air from the main reservoir to flow through the reducing valve so as to be reduced to forty five pounds, then through port 12, cavity 5, port 10, passage 22′, port 17, passage 15′, port 15, application cylinder pipe 24, to the application cylinder, thus applying the brake on the engine. As stated before the engine brake only is applied in this position and the brake pipe is still being supplied through the feed valve which maintains the brake pipe charged and prevents the brake from applying on the train. If the handle H is allowed to remain in this position, the engine brake will apply to the extent of forty five pounds in the cylinder. Should however a lighter application be desired the handle can be moved back to the left to number three position which I have designated as holding or independent lap position and by manipulating the handle between positions 3 and 4 the engine brake can be applied with as many applications as desired until the pressure is up to forty five pounds or to whatever other pressure the reducing valve may have been set. To release the engine brake after independent application or automatic service or emergency position the handle may be moved to number two position and if the brake has been applied independently, the position of the rotary will be as shown in Figure 2, if in automatic or emergency position then as in Figure 8. As the handle is placed in independent service the port 7 in the segment A of the rotary valve overlaps the train line exhaust port 30 in the seat, but the equalizing reservoir air has not been disturbed in this position. The equalizing discharge valve still remains on its seat, and therefore, the air cannot escape from the brake pipe in this position. To apply the brake in automatic service or number five positions the handle is moved to the position shown in Figure 5.

As the handle is being turned to the right to number five positions both segments A and B of the rotary valve are turned to position which is shown in Figure 5. It will be noted that the segment B has been turned because of the pin or lug P engaging the end of slot or notch N thus causing segment B to follow segment A. As the valve is turning from independent service position to automatic service position the first part of the movement of segment B of the rotary valve closes the feed valve port 4 and the equalizing port 34 thus stopping the flow of air through the feed valve to the brake pipe and the equalizing reservoir and as the handle H nears the service notch, the port 13 in the segment A of the rotary valve which is connected to the exhaust port 25 by passage 13′, overlaps port 8 allowing equalizing reservoir air to escape to the atmosphere, as the pressure on top of the equalizing discharge piston reduces, the train line pressure underneath now being the greater raises the piston and opens the brake pipe exhaust and the brake pipe air flows through the brake pipe exhaust passage to port 30 in the seat which is now overlapped by the groove 7′ in the segment A of the rotary valve connected to port 7 and it in turn to exhaust port 25 by passage 7ᵃ thus allowing the brake pipe air to flow to the atmosphere until equalized with the equalizing reservoir pressure thus applying engine and train brake. As the valve was turned to this position, the cavity 5 in segment B was turned until it no longer overlapped port 10 in the seat, the reducing valve is no longer in service. If the handle H is turned to the position shown in Figure 7 it will be noted that as the handle turns from position 5 to 4 only the segment A of the rotary valve has turned and therefore has left segment B as is in Figure 5 with the feed valve and reducing valve closed and all the ports in the rotary valve are closed except 7 registering with port 30 thus forming lap positions. In this lap position the brakes are now applied on the engine and train in automatic service and the valve on lap until it is desired to release. To release the engine brake and not the train brake, the handle is moved to number two position and the valve will be disclosed as shown in Figure 9.

As the handle is turned to the left to position 9 the first part of the movement causes the rotation of the segment A of the rotary valve only but as the handle passes position number three the pin P comes in contact with the end of the notch N causing rotation of the segment B to the position shown in Figure 9. In this position the port 19 in the segment A communicates through passage 19′ with opening 25 and overlaps the application port 24 in the seat thus allowing the air from the application cylinder to escape to the exhaust. This releases the engine. However, the outside segment B has not opened the feed valve and therefore the train brakes are still applied. It will be noted that the segment B has turned far enough to open the reducing valve port 10 so that if the handle H were turned to the independent service or position 4 the engine brake could be applied independently.

To release the train brake and not the engine brake, after a service or emergency application, the handle should be moved to number one or full release position thus giving a direct communication between the main reservoir as stated before. Then, by moving the handle to number three or holding position as stated in the beginning the train brake is released but the engine brake will not be released until the handle has been placed in number two or running position. To apply the engine brake stronger while releasing the train brake after the handle has been placed in full release position, if the engine brake is not set to forty five pounds, the handle H should be moved to number four or independent service position. To apply the brakes in emergency, the handle is moved to number six or emergency position as shown in Figure 6. In this position the rotary valve has both parts turned to the extreme right and the cavity 3 and extension of cavity 3 to port 31 in the segment B does not connect ports 6, 8 and 34 in the seat and therefore no air can get into the brake pipe. The port 7 in the segment A overlaps the brake pipe 2 in the seat thus allowing the brake pipe air to escape to exhaust very rapidly so as to make a sudden application possible for applying the brakes in emergency on both the engine and train. The port 23 in the segment A of the rotary valve overlaps the equalizing port 8 in the seat and therefore allows the equalizing reservoir air to flow through the exhaust ports 23, 25 and 32 to the atmosphere. The main reservoir air flows through the port 35 in the segment A of the rotary valve which overlaps the cavity 24' in the seat and thus connects the application cylinder pipe port 24 in the seat to the application cylinder thereby obtaining a maintaining feature by allowing the main reservoir air to feed in the application cylinder holding the pressure above that of the safety valve.

When the segment A is in positions numbers two or three, after having been in position number five or six, the cavity 3 registers with ports 50 and 52. The port 50 leads to the distributing valve release pipe and the port 52, through passage 52', leads to port 54. In position eight the port 53 registers with the port 54 and passage 53' leads from port 53 to the exhaust ports 25. This position number eight allows, when double heading, the engineer of the first engine to control the brakes of the second engine automatically.

It will now be apparent from the foregoing that I have devised a novel construction of engineer's valve which will embody in a single valve structure operated by a single handle the features of the independent brake valve in addition to the usual automatic brake valve and also the double heading cock all of which are independently operated in the standard Westinghouse engineer valve system now in use. It will also be apparent that the valve embodies the features of advantage enumerated as desirable in the statement of the invention and the above description, and while I have in the present instance shown and described a preferred embodiment of it which will give in practice satisfactory and reliable results, it is to be understood that the same is susceptible of modification in various particulars without departing from the spirit or scope of the invention as hereinafter claimed without sacrificing any of its advantages. It is also evident that my valve is applicable in principle to a large number of different types of air brake systems now in use.

Having thus described my invention, what I claim as new is:

1. In an engineer's brake valve, a valve seat provided with ports, a valve member for operating with said seat and provided with cavities and ports and controlling the ports in the valve seats, said valve member including a pair of independently rotatable segments, and means between the segments for forming a take up connection therebetween.

2. In an engineer's brake valve, a valve seat provided with ports, a valve member for operating with said seat and provided with cavities and ports and controlling the ports in the valve seats, said valve member including a pair of independently rotatable segments, means between the segments for forming a take up connection therebetween, and an actuating stem for one of the segments.

3. In an engineer's brake valve, a valve seat provided with ports, a valve including an inner segment and an outer segment both rotatable on the seat and provided with cavities and ports for controlling the ports in the valve seat, a take up connection means between the segments, and means for rotating one of the segments.

4. In an engineer's brake valve, a valve seat provided with ports, a valve member cooperating with said seat and including two segments, one in the form of a disc and the other in the form of a ring, a pin and slot connection between the segments, and means for rotating one of the segments, said segments provided with cavities and ports for controlling the ports in the valve seat.

5. In an engineer's brake valve, the combination of a valve seat provided with ports connecting to the main reservoir, the train pipe, the equalizing reservoir, the atmosphere and the engine brakes, a valve cooperating with said seat and including two segments one rotatable within the other, a follow up connection means between the segments, said segments provided with cavities arranged in different positions to establish different connections between the main reservoir, the train pipe, the equalizing reservoir and the atmosphere to effect the automatic control of the train brakes, and provided with other ports arranged in different positions to connect the main reservoir port with the engine brake application port to apply the engine brakes, in another position thereof to connect the engine brake application port with the atmosphere to release the engine brakes, and in other positions to blank said ports.

6. In an engineer's brake valve, a valve seat provided with ports, a valve member including an inner segment and an outer segment disposed about the inner segment, a pin projecting from the edge of the inner segment, said outer segment provided with an elongated notch for receiving the pin, said segments of the valve member cooperating with said seat and provided with cavities and ports and controlling the ports in the valve seat.

7. In an engineer's brake valve, a valve seat provided with ports, a valve member including an inner segment and an outer segment disposed about the inner segment, a pin projecting from the edge of the inner segment, said outer segment provided with an elongated notch for receiving the pin, said segments of the valve member cooperating with said seat and provided with cavities and ports and controlling the ports in the valve seat, and means connected to one segment whereby said segment may be partially rotated independently of the other segment and also rotated so as to rotate the other segment through the pin and slot.

In testimony whereof I affix my signature.

HERMAN H. BEAL.